United States Patent
Tashiro et al.

(10) Patent No.: US 9,731,619 B2
(45) Date of Patent: Aug. 15, 2017

(54) VEHICLE AND CONTROL METHOD FOR VEHICLE

(71) Applicant: TOYOTA JIDOSHA KABUSHIKI KAISHA, Toyota-shi, Aichi-ken (JP)

(72) Inventors: Hiroki Tashiro, Aichi-gun (JP); Hiromasa Tanaka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/912,486

(22) PCT Filed: Sep. 1, 2014

(86) PCT No.: PCT/IB2014/001652
§ 371 (c)(1),
(2) Date: Feb. 17, 2016

(87) PCT Pub. No.: WO2015/033199
PCT Pub. Date: Mar. 12, 2015

(65) Prior Publication Data
US 2016/0193940 A1    Jul. 7, 2016

(30) Foreign Application Priority Data

Sep. 4, 2013   (JP) ................................. 2013-183477

(51) Int. Cl.
*B60R 16/03*    (2006.01)
*B60K 6/445*    (2007.10)
(Continued)

(52) U.S. Cl.
CPC ....... *B60L 11/1868* (2013.01); *B60L 11/1809* (2013.01); *B60L 11/1861* (2013.01);
(Continued)

(58) Field of Classification Search
CPC ..... B60L 11/1861; B60K 6/445; B60K 6/448; B60K 6/442; B60K 6/32; B60R 16/03; B60W 10/06
See application file for complete search history.

(56) References Cited

U.S. PATENT DOCUMENTS 6,163,135 A * 12/2000 Nakayama ............. B60K 6/445
                                                320/150
9,180,864 B2 * 11/2015 Hosoe ................... B60W 10/06
(Continued)

FOREIGN PATENT DOCUMENTS

CN        101888940 A    11/2010
EP          2221208 A1    8/2010
(Continued)

*Primary Examiner* — Yuri Kan
(74) *Attorney, Agent, or Firm* — Oliff PLC

(57) ABSTRACT

A vehicle includes a generator, an engine, a main battery, an auxiliary battery, and a controller. The engine is configured to perform a load operation and a self-supported operation. The controller is configured to control charging and discharging of the auxiliary battery. When an upper limit of an allowable charging power of the main battery decreased and a command power is in a state in which the load operation and the self-supported operation are alternately switched, the controller is configured to operate a continuous charging. The continuous charging is to charge the auxiliary battery continuously for a predetermined time with a charging power. The charging power is a power which increases the command power to be equal to or larger than the threshold.

7 Claims, 5 Drawing Sheets

(51) Int. Cl.
*B60L 11/18* (2006.01)
*B60W 20/00* (2016.01)

(52) U.S. Cl.
CPC ............ *B60W 20/00* (2013.01); *Y02T 10/705* (2013.01); *Y02T 10/7011* (2013.01); *Y02T 10/7044* (2013.01); *Y10S 903/907* (2013.01)

(56) References Cited

U.S. PATENT DOCUMENTS

| | | | |
|---|---|---|---|
| 2006/0058897 A1* | 3/2006 | Senda | B60R 16/03 700/22 |
| 2010/0222952 A1 | 9/2010 | Yamaguchi | |
| 2010/0244558 A1* | 9/2010 | Mitsutani | B60K 6/32 307/9.1 |
| 2011/0101915 A1* | 5/2011 | Mitsutani | B60K 6/445 320/109 |
| 2011/0241859 A1* | 10/2011 | Handa | B60K 6/448 340/438 |
| 2012/0143425 A1* | 6/2012 | Yamamoto | B60K 6/442 701/22 |
| 2014/0297088 A1* | 10/2014 | Ando | B60K 6/445 701/22 |

FOREIGN PATENT DOCUMENTS

| | | |
|---|---|---|
| JP | 2000-092614 A | 3/2000 |
| JP | 2009-286174 A | 12/2009 |
| JP | 2012-239282 A | 12/2012 |
| JP | 2012-245879 A | 12/2012 |

* cited by examiner

VEHICLE AND CONTROL METHOD FOR VEHICLE

BACKGROUND OF THE INVENTION

1. Field of the Invention

The invention relates to a vehicle including an engine and a battery and a control method for the vehicle.

2. Description of Related Art

In a vehicle including an engine and a battery (a so-called hybrid vehicle), as described in Japanese Patent Application Publication No. 2000-092614 (JP 2000-092614 A) and the like, the power of the engine is transmitted to a generator to cause the generator to generate electric power and the battery is charged using the electric power generated by the generator. As described in Japanese Patent Application Publication No. 2009-286174 (JP 2009-286174 A) and the like, as the operation of the engine, there are a load operation and a self-supported operation.

In the load operation, the power of the engine is transmitted to the generator and the power generation by the generator is performed. The load operation is performed, for example, when a state of charge (SOC) of the battery decreases and the battery needs to be charged. In the self-supported operation, the engine is operating but the power generation by the generator is not performed. The self-supported operation is performed, for example, when the engine is used as a heat source in order to heat the interior of the vehicle.

The operation of the engine is switched between the load operation and the self-supported operation according to command power to the engine. Specifically, when the command power to the engine is larger than command power set in advance (a threshold), the load operation is performed. When the command power to the engine is smaller than the command power set in advance (the threshold), the self-supported operation is performed.

When the command power to the engine is near the command power set in advance (the threshold) and changes according to pulsation or the like of the engine, the command power to the engine sometimes changes between a value larger than the threshold and a value smaller than the threshold. Consequently, the operation of the engine is switched between the load operation and the self-supported operation. In particular, when the fluctuations in the command power to the engine are repeated in a range including the threshold, the operation of the engine is frequently switched between the load operation and the self-supported operation.

If the electric power can be supplied from the generator to the battery, it is possible to increase the command power to the engine and continue the load operation. However, when the charging of the battery is limited and it is hard to supply the electric power from the generator to the battery, the command power to the engine less easily increases. Consequently, the command power to the engine tends to stay near the threshold. As explained above, the operation of the engine is sometimes frequently switched between the load operation and the self-supported operation.

In the load operation and the self-supported operation, engine speeds are different from each other. Therefore, when the operation of the engine is frequently switched between the load operation and the self-supported operation, engine speed sometimes frequently changes to give a sense of discomfort to a user.

SUMMARY OF THE INVENTION

A vehicle according to the invention includes a generator, an engine, a main battery, an auxiliary battery, a direct current-to-direct current (DC-DC) converter, and a controller. The engine is configured to perform a load operation and a self-supported operation. The load operation is an operation state in which, when the engine receives command power equal to or larger than a threshold, the engine operates with driving the generator. The self-supported operation is an operation state in which, when the engine receives the command power smaller than the threshold, the engine operates without driving the generator. The main battery is configured to output energy used for traveling of the vehicle. The main battery is configured to be charged by the generator. The auxiliary battery is configured to supply electric power to a load. The auxiliary battery is configured to be charged by the generator. The DC-DC converter is configured to step down an output voltage of the generator to the auxiliary battery. The controller is configured to control charging and discharging of the auxiliary battery. The controller is configured to operate a continuous charging when an upper limit of an allowable charging power of the main battery decreases and the command power is in a state in which the load operation and the self-supported operation are alternately switched. The continuous charging is to charge the auxiliary battery continuously for a predetermined time with a charging power. The charging power is a power which increases the command power to be equal to or larger than the threshold.

According to the invention, it is possible to increase, with the charged power set when the charging of the auxiliary battery is continued, the command power to the engine to be equal to or larger than the threshold and cause the engine to perform the load operation. It is possible to continue the load operation of the engine for the predetermined time by continuing the charging of the auxiliary battery for the predetermined time. Consequently, it is possible to prevent the operation of the engine from being frequently switched between the load operation and the self-supported operation. It is possible to prevent the user to feel discomfort caused by a change in engine speed.

When the controller operates the continuous charging, the controller may configured to stop the charging of the auxiliary battery every time the predetermined time elapses. Consequently, it is possible to delay an increase in a SOC of the auxiliary battery and extend time until the auxiliary battery becomes unable to be charged. When the charging of the auxiliary battery is temporarily stopped, the command power to the engine sometimes decreases to be smaller than the threshold. However, the charging of the auxiliary battery can be continued for the predetermined time. It is possible to prevent frequent switching of the operation of the engine simply by continuing the charging of the auxiliary battery for the predetermined time.

The upper limit may change according to a parameter indicating a state of the main battery. The controller may be configured to monitor the parameter and discharge the auxiliary battery before the upper limit decreases. Therefore, if the parameter is monitored, it is possible to know beforehand that the upper limit power decreases. In order to continue the charging of the auxiliary battery, it is desirable to discharge the auxiliary battery before continuing the charging of the auxiliary battery. If it is possible to grasp beforehand that the upper limit power decreases, it is possible to discharge the auxiliary battery before the upper limit power decreases. Consequently, it is easy to continue the charging of the auxiliary battery.

Examples of the parameter indicating a state of the main battery include the temperature of the main battery and a SOC of the main battery. When the auxiliary battery is discharged, discharged power of the auxiliary battery can be used for traveling of the vehicle. The vehicle may include a motor. The DC-DC converter may be configured to step up an output voltage of the auxiliary battery and output electric power with the step-up voltage to the motor when the auxiliary battery is discharged. The motor may convert the input electric power into kinetic energy used for traveling of the vehicle. Power consumption in causing the vehicle to travel tends to be high. Therefore, it is easy to discharge the auxiliary battery by using the discharged power of the auxiliary battery for the traveling of the vehicle.

The controller may be configured to set the charging power, according to a difference between the command power before operating the continuous charging and the threshold, in continuing the charging of the auxiliary battery. If the charged power is set in this way, it is possible to prevent, while increasing the command power to the engine to be equal to or larger than the threshold, the command power from increasing more than necessary. In order to continue the load operation, the command power only has to be equal to or larger than the threshold. Therefore, it is unnecessary to increase the command power more than necessary.

The vehicle may include a sensor. The sensor may output information concerning detection of a shift position to the controller. The controller may be configured to operate the continuous charging when the upper limit power is equal to or smaller than predetermined power and the shift position is one of a parking range (P range) and a neutral range (N range).

When the shift position is the P range or the N range, an output required by the entire vehicle tends to decrease and the command power to the engine also tends to decrease. In this state, when the upper limit power is equal to or smaller than the predetermined power, the command power tends to fluctuate between a value larger than the threshold and a value smaller than the threshold. The operation of the engine tends to be frequently switched. Therefore, as explained above, if the charging of the auxiliary battery is continued after the upper limit power and the shift position are checked, it is possible to prevent the frequent switching of the operation of the engine.

A control method for a vehicle includes a configuration explained below. The vehicle includes a generator, an engine, a main battery, an auxiliary battery, a DC-DC converter, and a controller. The engine is configured to perform a load operation and a self-supported operation. The load operation is an operation state in which, when the engine receives command power equal to or larger than a threshold, the engine operates with driving the generator. The self-supported operation is an operation state in which, when the engine receives the command power smaller than the threshold, the engine operates without driving the generator. The main battery is configured to output energy used for traveling of the vehicle, the main battery being configured to be charged by the generator. The auxiliary battery is configured to supply electric power to a load, the auxiliary battery being configured to be charged by the generator. The DC-DC converter is configured to step down an output voltage of the generator to the auxiliary battery. The controller is configured to control charging and discharging of the auxiliary battery. The control method includes operating the continuous charging by the controller, when an upper limit of an allowable charging power of the main battery decreases and the command power is in a state in which the load operation and the self-supported operation are alternately switched. The continuous charging is to charge the auxiliary battery continuously for a predetermined time with a charging power. The charging power is a power which increases the command power to be equal to or larger than the threshold.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention is explained below.

Figure 1:
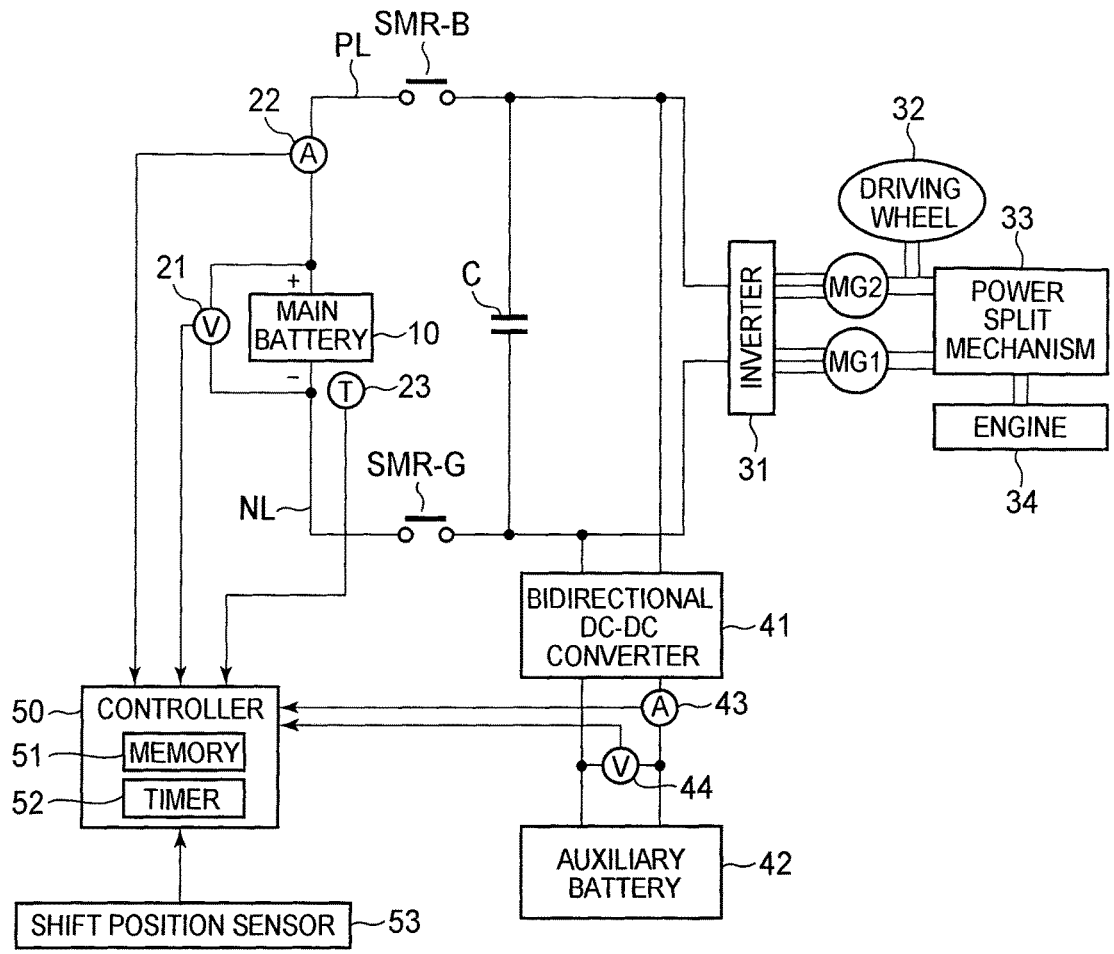
FIG. 1 is a diagram showing the configuration of the battery system.

FIG. 1 is a diagram showing the configuration of a battery system in this embodiment. The battery system is mounted on a vehicle (a so-called hybrid vehicle).

A main battery (a battery pack) 10 includes a plurality of single batteries connected in series. As the single battery, a secondary battery such as a nickel hydrogen battery or a lithium ion battery can be used. The main battery 10 may include a plurality of single batteries connected in parallel.

A voltage sensor 21 detects a voltage value of the main battery 10 and outputs a detection result to a controller 50. A current sensor 22 detects a current value of the main battery 10 and outputs a detection result to the controller 50. As a current value obtained when the main battery 10 is discharged, a positive value is used. As a current value obtained when the main battery 10 is charged, a negative value is used. A temperature sensor 23 detects the temperature of the main battery 10 and outputs the temperature to the controller 50.

When charging and discharging of the main battery 10 are controlled, a target SOC (a target value of an SOC) is set. The charging and discharging of the main battery 10 are controlled such that an SOC of the main battery 10 changes according to the target SOC. The charging and discharging control for the main battery 10 is executed by the controller 50.

The SOC is a ratio of the present charging capacity to a full charge capacity. The SOC of the main battery 10 can be estimated using the detection results of the voltage sensor 21 and the current sensor 22. Note that, as a method of estimating the SOC, a conventional method can be adopted as appropriate. A specific method of estimating the SOC is not explained.

A system main relay SMR-B is provided in a positive electrode line (PL) connected to a positive electrode terminal of the main battery 10. A system main relay SMR-G is provided in a negative electrode line (NL) connected to a negative electrode terminal of the main battery 10. The system main relays SMR-B and SMR-G receive a control signal from the controller 50 to be switched between on and off. When an ignition switch is on, the controller 50 turns on the system main relays SMR-B and SMR-G. When the ignition switch is off, the controller 50 turns off the system main relays SMR-B and SMR-G.

A capacitor (C) is connected to the PL and the NL. The C is used for smoothing a voltage value between the PL and the NL. An inverter 31 is connected to the main battery 10 via the PL and the NL. When the system main relays SMR-B and SMR-G are on, the main battery 10 and the inverter 31 are connected. If the system main relays SMR-B and SMR-G are off, the main battery 10 and the inverter 31 are disconnected.

The inverter 31 converts DC power output from the main battery 10 into alternating-current power and outputs the alternating-current power to a motor generator (MG) (equivalent to the motor of the invention) MG2. The MG2 receives the alternating-current power output from the inverter 31 and generates kinetic energy. It is possible to cause the vehicle to travel by transmitting the kinetic energy generated by the MG2 to a driving wheel 32.

A power split mechanism 33 transmits the power of an engine 34 to the driving wheel 32 and transmits the power to a MG1. The (equivalent to the generator of the invention) MG1 receives the power of the engine 34 to perform power generation. Alternating-current power generated by the MG1 is supplied to the MG2 and supplied to the main battery 10 via the inverter 31. If the electric power generated by the MG1 is supplied to the MG2, it is possible to drive the driving wheel 32 with the kinetic energy generated by the MG2. If the electric power generated by the MG1 is supplied to the main battery 10, it is possible to charge the main battery 10.

The controller 50 includes a memory 51 and a timer 52. The memory 51 has stored therein various kinds of information for the controller 50 to perform predetermined processing. The timer 52 is used for measurement of time. The memory 51 and the timer 52 are incorporated in the controller 50. However, at least one of the memory 51 and the timer 52 can be provided on the outside of the controller 50. The controller 50 can be configured by one electric control unit (ECU) or configured by a plurality of ECUs. When the controller 50 is configured by the plurality of ECUs, the respective ECUs can communicate with the other ECUs.

A step-up circuit can be provided in a current route between the main battery 10 and the inverter 31. The step-up circuit can step up an output voltage of the main battery 10 and output electric power after the step-up to the inverter 31. The step-up circuit can step down the output voltage of the inverter 31 and output electric power after the step-down to the main battery 10.

A bidirectional DC-DC converter 41 is connected to the PL and the NL. An auxiliary battery 42 is connected to the bidirectional DC-DC converter 41. The bidirectional DC-DC converter 41 can step up an output voltage of the auxiliary battery 42 and output electric power after the step-up to the main battery 10 and the inverter 31. The bidirectional DC-DC converter 41 can step down output voltages of the main battery 10 and the inverter 31 and output electric power after the step-down to the auxiliary battery 42. The controller 50 controls the operation of the bidirectional DC-DC converter 41.

The auxiliary battery 42 supplies electric power to an auxiliary machine (equivalent to the load of the invention) mounted on the vehicle. As the auxiliary battery 42, for example, a lead storage battery or a nickel hydrogen battery can be used. A nominal voltage of the auxiliary battery 42 is lower than a nominal voltage (a total voltage) of the main battery 10. A current sensor 43 detects a current value of the auxiliary battery 42 and outputs a detection result to the controller 50. As a current value obtained when the auxiliary battery 42 is discharged, a positive value is used. As a current value obtained when the auxiliary battery 42 is charged, a negative value is used. A voltage sensor 44 detects a voltage value of the auxiliary battery 42 and outputs a detection result to the controller 50.

When charging and discharging of the auxiliary battery 42 are controlled, a target SOC (a target value of an SOC) is set. The charging and discharging of the auxiliary battery 42 are controlled such that an SOC of the auxiliary battery 42 changes according to the target SOC. The charging and discharging control for the auxiliary battery 42 is executed by the controller 50. The target SOC set in the charging and discharging control for the auxiliary battery 42 may be the same as or may be different from the target SOC set in the charging and discharging control for the main battery 10.

The SOC of the auxiliary battery 42 can be estimated using the detection results of the current sensor 43 and the voltage sensor 44. Note that, as a method of estimating the SOC, a conventional method can be adopted as appropriate. A specific method of estimating the SOC is not explained.

If the bidirectional DC-DC converter 41 is used, the C can be charged using output electric power of the auxiliary battery 42. Specifically, the C can be charged before the system main relays SMR-B and SMR-G are turned on. If the C is charged in this way, when the system main relays SMR-B and SMR-G are turned on, it is possible to prevent a rush current from flowing from the main battery 10 to the C.

A shift position sensor 53 detects a shift position and outputs a detection result to the controller 50. As the shift position, as conventionally available, there are a drive range (D range), a P range, a N range, and a reverse range (R range).

Figure 2:
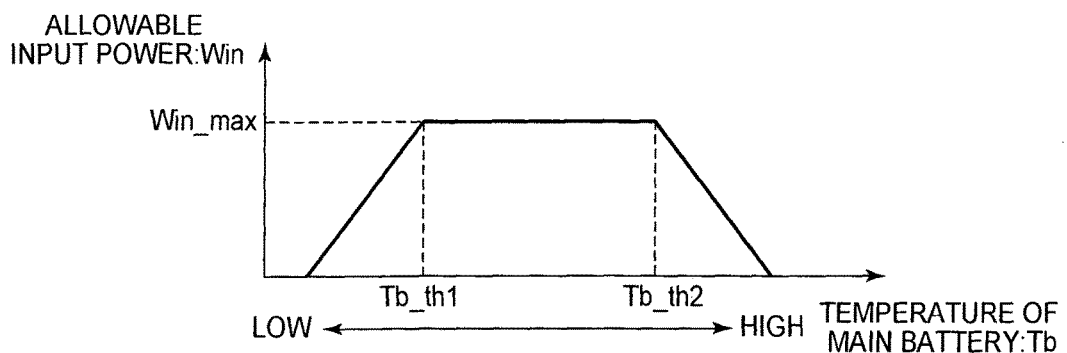
FIG. 2 is a diagram showing a relation between the temperature and allowable input power of the main battery.

FIG. 2 shows a relation between temperature Tb and allowable input power Win of the main battery 10. The allowable input power Win is an upper limit of the allowable power for charging (input) the main battery 10. The charging of the main battery 10 is controlled to prevent input electric power of the main battery 10 from increasing to be higher than the allowable input power Win.

When the temperature Tb is present between first temperature Tb_th1 and second temperature Tb_th2, the allowable input power Win is set to maximum power Win_max. The second temperature Tb_th2 is temperature higher than the first temperature Tb_th1. The maximum power Win_max is set as appropriate taking into account input and output characteristics and the like of the main battery 10.

On the other hand, when the temperature Tb is lower than the first temperature Tb_th1, the allowable input power Win is set to a value lower than the maximum power Win_max. The lower the temperature Tb is than the first temperature Tb_th1, the more the allowable input power Win decreases. The lower the temperature Tb is than the first temperature Tb_th1, since input performance of the main battery 10 is deteriorated, the more the allowable input power Win is reduced.

When the temperature Tb is higher than the second temperature Tb_th2, the allowable input power Win is set to a value lower than the maximum power Win_max. The higher the temperature Tb is than the second temperature Tb_th2, the more the allowable input power Win decreases. The main battery 10 generates heat with charging. In order to prevent an excessive temperature rise of the main battery 10, the higher the temperature Tb is than the second temperature Tb_th2, the more the allowable input power Win is reduced.

In this way, the allowable input power Win changes according to the temperature Tb of the main battery 10. Even after the allowable input power Win is reduced, the allowable input power Win can be increased according to a change in the temperature Tb. A correspondence relation shown in FIG. 2 can be represented as a map or an arithmetic expression. Information indicating the correspondence relation can be stored in the memory 51.

Figure 3:
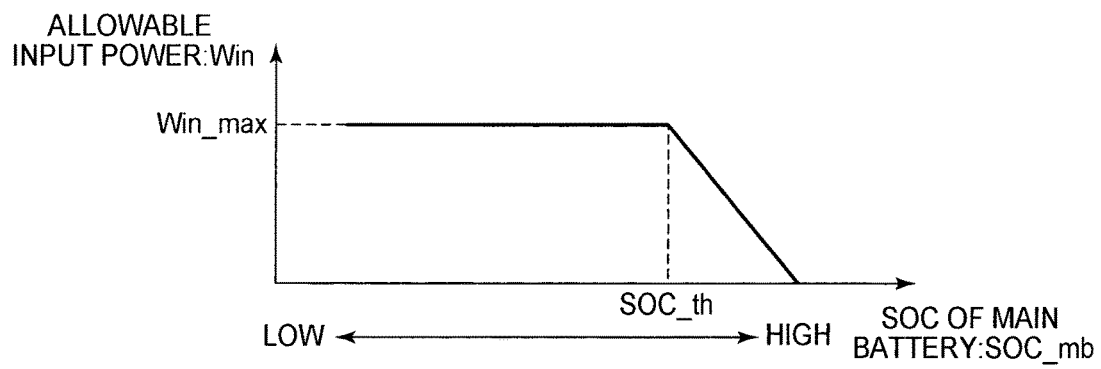
FIG. 3 is a diagram showing a relation between an SOC and the allowable input power of the main battery.

FIG. 3 shows a correspondence relation between the SOC (SOC_mb) and the allowable input power Win of the main battery 10. When the SOC_mb is lower than a threshold (SOC) SOC_th, the allowable input power Win is set to the maximum power Win_max. On the other hand, when the SOC_mb is higher than the threshold SOC_th, the allowable input power Win is set to a value lower than the maximum power Win_max. The higher the SOC_mb is than the threshold SOC_th, the more the allowable input power Win decreases. In order to prevent overcharging of the main battery 10, the higher the SOC_mb is than the threshold SOC_th, the more the allowable input power Win is reduced.

In this way, the allowable input power Win changes according to the SOC_mb. Even after the allowable input power Win is reduced, the allowable input power Win can be increased according to the change (the decrease) in the SOC_mb. The correspondence relation shown in FIG. 3 can be represented as a map or an arithmetic expression. Information indicating the correspondence relation can be stored in the memory 51. As explained above, the allowable input power Win is set according to the temperature Tb and the SOC_mb.

In the vehicle in this embodiment, as the operation of the engine 34 a load operation and a self-supported operation are performed. The load operation is an operation state in which the power of the engine 34 is transmitted to the MG1 to cause the MG1 to perform power generation. In the load operation, the engine 34 is operating in a state in which the engine 34 receives a load involved in the power generation of the MG1: Electric power generated by the MG1 in the load operation can be supplied to the main battery 10 and the auxiliary battery 42.

The self-supported operation is an operation state in which the power generation of the MG1 is not performed and the engine 34 is caused to operate. In the self-supported operation, the engine 34 is operating without receiving a load involved in the power generation of the MG1. When the engine 34 is performing the self-supported operation, the power of the engine 34 is not transmitted to the driving wheel 32 because of a power generation stop of the MG1 and action of the power split mechanism 33 involved in the power generation stop.

When command power Pe to the engine 34 is equal to or larger than a threshold (command power) Pth set in advance, the load operation is performed. When the command power Pe to the engine 34 is smaller than the threshold Pth, the self-supported operation is performed. The command power Pe to the engine 34 is specified on the basis of an output required in the entire vehicle.

When the command power Pe to the engine 34 frequently fluctuates between a value larger than the threshold Pth and a value smaller than the threshold Pth, the operation of the engine 34 is frequently switched between the load operation and the self-supported operation. According to the frequent switching of the operation of the engine 34, the speed of the engine 34 sometimes frequently fluctuates to give a sense of discomfort to the user.

As explained above, the command power Pe to the engine 34 is specified on the basis of the output required in the entire vehicle. Therefore, when the output required in the entire vehicle tends to decrease, in other words, when the vehicle is not traveling, the command power Pe to the engine 34 tends to decrease. In a range including the threshold Pth, the command power Pe tends to fluctuate. When the vehicle is not traveling, usually, the shift position is the P range or the N range.

In this embodiment, a sense of discomfort involved in frequent fluctuations in the speed of the engine 34 is prevented from being given to the user. Specifically, in this embodiment, a state in which the command power Pe to the engine 34 is larger than the threshold Pth is maintained. Consequently, it is possible to prevent the command power Pe to the engine 34 from changing between a value larger than the threshold Pth and a value smaller than the threshold Pth. It is possible to prevent the operation of the engine 34 from being frequently switched between the load operation and the self-supported operation.

Figure 4:
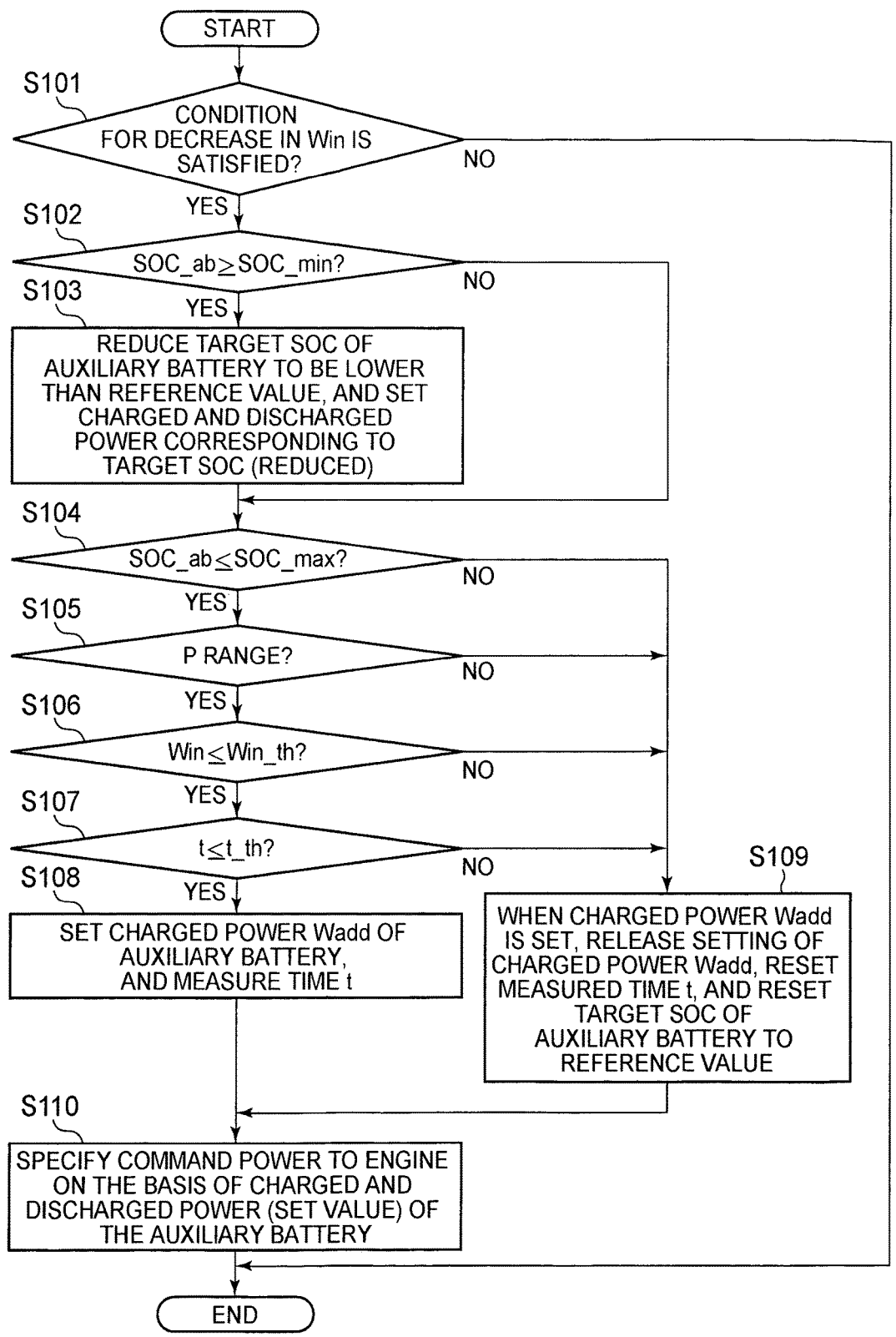
FIG. 4 is a flowchart for explaining processing for setting charged and discharged power of an auxiliary battery.

Processing for maintaining the command power Pe to the engine 34 in a state in which the command power Pe is larger than the threshold Pth is explained with reference to a flowchart of FIG. 4. The processing shown in FIG. 4 is executed by the controller 50 and repeated at a predetermined cycle.

In step S101, the controller 50 determines whether a condition for a decrease in the allowable input power Win is satisfied. The allowable input power Win is changed on the basis of a parameter indicating a state of the main battery 10. Therefore, the condition for a decrease in the allowable input power Win can be set concerning the parameter. If the parameter is monitored, it is possible to determine whether the parameter satisfies the condition for a decrease in the allowable input power Win.

In this embodiment, the parameter affecting the setting of the allowable input power Win is monitored rather than the allowable input power Win. Consequently, it is possible to grasp beforehand whether the allowable input power Win decreases. The parameter indicating the state of the main battery 10 is a parameter for specifying the state of the main battery 10 and is a parameter for changing the allowable input power Win. Examples of the parameter include the temperature Tb of the main battery 10 explained with reference to FIG. 2 and the SOC (SOC_mb) of the main battery 10 explained with reference to FIG. 3.

As the condition for a decrease in the allowable input power Win, specifically, a condition that the temperature Tb is lower than the first temperature Tb_th1 in FIG. 2 can be set. When the temperature Tb detected by the temperature sensor 23 is lower than the first temperature Tb_th1, in the processing in step S101, the controller 50 can determine that the condition for a decrease in the allowable input power Win is satisfied.

As the condition for a decrease in the allowable input power Win, a condition that the temperature Tb is higher than the second temperature Tb_th2 in FIG. 2 can be set. When the temperature Tb detected by the temperature sensor 23 is higher than the second temperature Tb_th2, in the processing in step S101, the controller 50 can determine that the condition for a decrease in the allowable input power Win is satisfied.

Note that temperatures different from the first temperature Tb_th1 and the second temperature Tb_th2 can be set to set the condition for a decrease in the allowable input power Win. For example, temperature higher than the first temperature Tb_th1 can be set instead of the first temperature Tb_th1. A condition that the temperature Tb is lower than the set temperature can be set as the condition for a decrease in the allowable input power Win. Temperature lower than the second temperature Tb_th2 can be set instead of the second temperature Tb_th2. A condition that the temperature Tb is higher than the set temperature can be set as the condition for a decrease in the allowable input power Win.

On the other hand, as the condition for a decrease in the allowable input power Win, a condition that the SOC_mb is higher than the threshold SOC_th in FIG. 3 can be set. When the SOC_mb is higher than the threshold SOC_th, in the processing in step S101, the controller 50 can determine that the condition for a decrease in the allowable input power Win is satisfied. Note that an SOC different from the threshold SOC_th can be set to set the condition for a decrease in the allowable input power Win. For example, an SOC lower than the threshold SOC_th can be set instead of the threshold SOC_th. A condition that the SOC_mb is higher than the set SOC can be set as the condition for a decrease in the allowable input power Win.

Note that, even if a parameter is different from the temperature Tb and the SOC_mb, the condition for a decrease in the allowable input power Win can be set concerning the parameter. That is, when the allowable input power Win is changed on the basis of a specific parameter, as in the case of the temperature Tb and the SOC_mb, the condition for a decrease in the allowable input power Win can be set. By monitoring the specific parameter, it is possible to determine whether the condition for a decrease in the allowable input power Win is satisfied. When the allowable input power Win is changed on the basis of a plurality of parameters (including the temperature Tb and the SOC_mb), it is possible to determine whether the condition for a decrease in the allowable input power Win is satisfied concerning at least one parameter.

For example, when a lithium ion secondary battery is used as the single battery of the main battery 10, a parameter for grasping a deposition state of lithium can be specified. The allowable input power Win can be changed on the basis of the parameter. Specifically, the deposition state of lithium can be grasped using the parameter. In order to prevent deposition of lithium, the allowable input power Win can be reduced. In this case, as in the case explained above, the condition for a decrease in the allowable input power Win can be set. If the parameter is monitored, it is possible to determine whether the condition for a decrease in the allowable input power Win is satisfied.

When determining in the processing in step S101 shown in FIG. 4 that the condition for a decrease in the allowable input power Win is satisfied, the controller 50 performs processing in step S102. On the other hand, when determining that the condition for a decrease in the allowable input power Win is not satisfied, the controller 50 ends the processing shown in FIG. 4.

In step S102, the controller 50 determines whether an SOC (SOC_ab) of the auxiliary battery 42 is equal to or higher than a lower limit value SOC_min. The lower limit value SOC_min is a value set in advance for preventing over-discharging of the auxiliary battery 42. Information for specifying the lower limit value SOC_min can be stored in the memory 51. When the SOC_ab is equal to or higher than the lower limit value SOC_min, the controller 50 performs processing in step S103. On the other hand, when the SOC_ab is lower than the lower limit value SOC_min, the controller 50 performs processing in step S104.

In step S103, the controller 50 reduces the target SOC of the auxiliary battery 42 and sets charged and discharged power of the auxiliary battery 42 on the basis of the reduced target SOC. Before the processing proceeds from the processing in step S101 to the processing in step S102, the target SOC of the auxiliary battery 42 is set to a reference value set in advance. In the processing in step S103, the controller 50 reduces the target SOC of the auxiliary battery 42 to be lower than the reference value.

By reducing the target SOC of the auxiliary battery 42, it is possible to increase electric energy chargeable in the auxiliary battery 42. When the target SOC of the auxiliary battery 42 is reduced, the auxiliary battery 42 tends to be discharged. Discharged power of the auxiliary battery 42 can be supplied to, for example, any one of the auxiliary machine, the main battery 10, and the MG2. Power consumption of the MG2 tends to be higher than power consumption of the auxiliary machine. Therefore, if the discharged power of the auxiliary battery 42 is supplied to the (equivalent to the load of the invention) MG2, it is easy to reduce the SOC of the auxiliary battery 42. Consequently, it is possible to quickly perform processing for reducing the target SOC of the auxiliary battery 42.

An amount of the reduction of the target SOC of the auxiliary battery 42 can be set as appropriate. That is, the target SOC of the auxiliary battery 42 only has to be reduced to make it possible to increase the electric energy chargeable in the auxiliary battery 42. However, the reduced target SOC is desirably equal to or lower than the lower limit value SOC_min explained concerning the processing in step S102.

After the target SOC of the auxiliary battery 42 is reduced, the charging and discharging of the auxiliary battery 42 is controlled such that the SOC of the auxiliary battery 42 changes according to the reduced target SOC. Therefore, the charged and discharged power of the auxiliary battery 42 is set on the basis of the reduced target SOC and the present SOC of the auxiliary battery 42.

In step S104, the controller 50 determines whether the SOC (SOC_ab) of the auxiliary battery 42 is equal to or lower than an upper limit value SOC_max. The upper limit value SOC_max is a value higher than the lower limit value SOC_min and can be set as appropriate. For example, the upper limit value SOC_max can be set on the basis of a viewpoint of preventing over-charging of the auxiliary battery 42. Information for specifying the upper limit value SOC_max can be stored in the memory 51.

In processing explained below (processing in step S108), the auxiliary battery 42 is charged. When the SOC_ab is higher than the upper limit value SOC_max, the electric energy chargeable in the auxiliary battery 42 cannot be secured. When the SOC_ab is higher than the upper limit value SOC_max, if the auxiliary battery 42 is charged, the auxiliary battery 42 is sometimes over-charged. Therefore, in the processing in step S104, the controller 50 checks whether the SOC_ab is equal to or lower than the upper limit value SOC_max. When the SOC_ab is equal to or lower than the upper limit value SOC_max, the controller 50 performs processing in step S105. When the SOC_ab is higher than the upper limit value SOC_max, the controller 50 performs processing in step S109.

In step S105, the controller 50 determines whether the shift position is the P range. The present shift position can be detected using the shift position sensor 53. As explained above, when the shift position is the P range, the operation of the engine 34 tends to be frequently switched between the load operation and the self-supported operation according to frequent fluctuations in the command power Pe to the engine 34. Therefore, in the processing in step S105 the controller 50 checks whether the shift position is the P range. When the shift position is the P range, the controller 50 performs processing in step S106. When the shift position is not the P range, the controller 50 performs the processing in step S109.

In step S106, the controller 50 determines whether the currently set allowable input power Win is equal to or lower than predetermined power Win_th. The predetermined power Win_th is a value lower than the maximum power Win_max explained with reference to FIGS. 2 and 3 and can be set as explained below.

When the allowable input power Win decreases, electric power generated by the MG1 during the load operation sometimes cannot be supplied to the main battery 10. When the electric power cannot be supplied from the MG1 to the main battery 10, the command power Pe to the engine 34 tends to decrease. When the command power Pe to the engine 34 decreases, as explained above, the operation of the engine 34 tends to be frequently switched between the load operation and the self-supported operation according to fluctuations in the command power Pe.

Therefore, the allowable input power Win at the time when the frequent switching of the operation of the engine 34 is caused can be set as the predetermined power Win_th. When the predetermined power Win_th is set, the command power Pe to the engine 34 at the time when the shift position is the P range can be taken into account. In the processing in step S101, the parameter (the temperature Tb, the SOC_mb, etc.) at the time when the allowable input power Win is the predetermined power Win_th can be taken into account. That is, the condition for a decrease in the allowable input power Win can be set on the basis of the parameter at the time when the allowable input power Win is the predetermined power Win_th.

When the predetermined power Win_th is set as explained above, if the present allowable input power Win is equal to or lower than the predetermined power Win_th, the operation of the engine 34 tends to be frequently switched between the load operation and the self-supported operation. Therefore, in the processing in step S106, the controller 50 checks whether the present allowable input power Win is equal to or lower than the predetermined power Win_th. When the allowable input power Win is equal to or lower than the predetermined power Win_th, the controller 50 performs processing in step S107. When the allowable input power Win is higher than the predetermined power Win_th, the controller 50 performs the processing in step S109.

The predetermined power Win_th can be set in advance for each, vehicle. Information for specifying the predetermined power Win_th can be stored in the memory 51. The controller 50 can grasp the currently set allowable input power Win. Therefore, the controller 50 can compare the allowable input power Win with the predetermined power Win_th.

In step S107, the controller 50 determines whether a measured time t is equal to or shorter than a predetermined time t_th. The measured time t is time (duration) in which the processing in step S108 explained below is performed. The measured time t is measured using the times 52. The predetermined time t_th is an upper limit time in which the processing in step S108 can be continuously performed. In this embodiment, the processing in step S108 is continued for the predetermined time t_th. Therefore, in the processing in step S107, the controller 50 checks whether the measured time t is equal to or shorter than the predetermined time t_th. When the measured time t is equal to or shorter than the predetermined time t_th, the controller 50 performs the processing in step S108. When the measured time t is longer than the predetermined time t_th, the controller 50 performs the processing in step S109.

In step S108, in order to charge the auxiliary battery 42, the controller 50 sets charged power Wadd of the auxiliary battery 42. Specifically, the charged power Wadd is set instead of the charged and discharged power set in the processing in step S103. When the charged power Wadd is set in a state in which the charged power Wadd is not set, as explained above, the measurement of the time t by the timer 52 is started as explained above. When the processing in step S108 is performed in a state in which the charged power Wadd is already set, the measurement of the time t is continued.

The charged power Wadd set in the processing in step S108 may be a fixed value set in advance or may be changed. When the command power Pe to the engine 34 before the start of the processing in step S108 is smaller than the threshold Pth, the charged power Wadd can be set according to a difference ΔP between the command power Pe and the threshold Pth. The difference ΔP is a value obtained by subtracting the command power Pe to the engine 34 before the start of the setting of the charged power Wadd from the threshold Pth.

Figure 5:
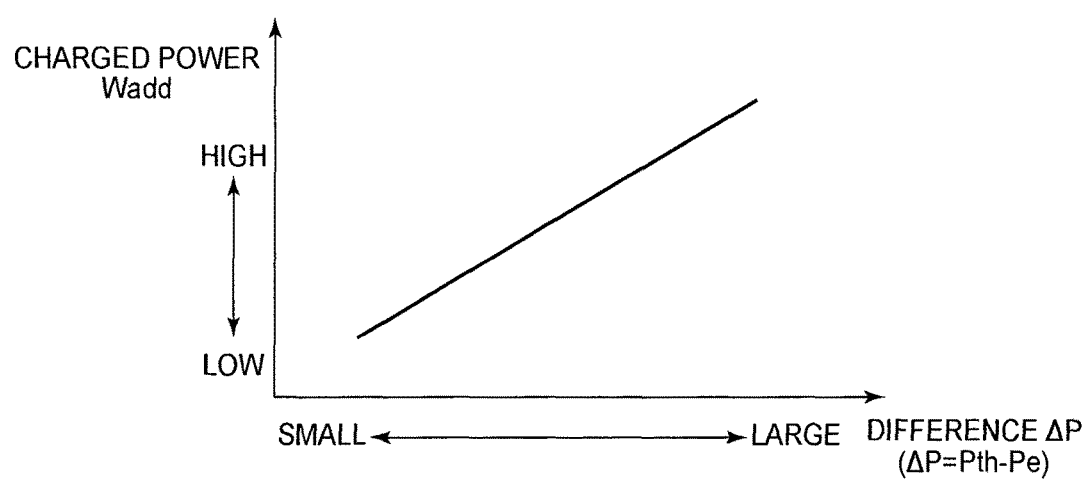
FIG. 5 is a diagram showing a relation between a difference between command power and a threshold and charged power of the auxiliary battery.

As shown in FIG. 5, the larger the difference ΔP between the command power Pe and the threshold Pth is, the more the charged power Wadd can be increased. In other words, the smaller the difference ΔP between the command power Pe and the threshold Pth is, the more the charged power Wadd can be reduced. In an example shown in FIG. 5, a relation between the difference ΔP and the charged power. Wadd is linearly changed. However, the relation between the difference ΔP and the charged power Wadd is not limited to this. As explained below, it is sufficient if the command power Pe can be set to be equal to or larger than the threshold Pth according to setting of the charged power. Wadd. The relation between the difference ΔP and the charged power Wadd can be set as appropriate. For example, the relation between the difference ΔP and the charged power Wadd can be changed along a curved line.

As explained above, if the charged power Wadd is set according to the difference ΔP between the command power Pe and the threshold Pth, it is possible to prevent the command power Pe from being increased more than necessary while setting the command power Pe after the setting of the charged power Wadd to be equal to or larger than the threshold Pth. When the command power Pe increases more than necessary, the charged power Wadd increases more than necessary. In this case, the SOC (SOC_ab) of the auxiliary battery 42 tends to increase according to the charging of the auxiliary battery 42.

When the SOC_ab is higher than the upper limit value SOC_max, the processing proceeds from the processing in step S104 to the processing in step S109. As explained below, setting of the charged power Wadd by the processing in step S108 is not performed. Therefore, in setting the charged power Wadd, it is desirable to set the SOC_ab not to easily increase and prevent the SOC_ab from increasing to be higher than the upper limit value SOC_max.

In step S109, when the charged power Wadd is set, the controller 50 releases the setting of the charged power Wadd to the auxiliary battery 42 and resets the measured time t. Consequently, the charged power Wadd of the auxiliary battery 42 is not set. Note that, when the processing in step S108 is not performed, the charged power Wadd of the auxiliary battery 42 is not set and the measurement of the measured time t is not started. Therefore, the release of the setting of the charged power Wadd and the resetting of the measurement time t are not performed.

In step S109, in releasing the setting of the charged power Wadd, the controller 50 resets the target SOC of the auxiliary battery 42 to the reference value explained in step S103. In this embodiment, when the charged power Wadd is set, the target SOC of the auxiliary battery 42 is reduced to be lower than the reference value according to the processing in step S103.

In releasing the setting of the charged power Wadd, since it is unnecessary to reduce the target SOC of the auxiliary battery 42 to be lower than the reference value, in the processing in step S109, the controller 50 resets the target SOC of the auxiliary battery 42 to the reference value according to the release of the setting of the charged power Wadd. Note that, when the charged power Wadd is not set, in the processing in step S109, the target SOC of the auxiliary battery 42 is maintained at a value lower than the reference value. Even after the target SOC of the auxiliary battery 42 is reset to the reference value, when the processing proceeds from the processing in step S102 to the processing in step S103, the target SOC of the auxiliary battery 42 decreases to be lower than the reference value.

In step S110, the controller 50 specifies the command power Pe to the engine 34 on the basis of the set charged and discharged power of the auxiliary battery 42. The command power Pe to the engine 34 is specified on the basis of an output required in the entire vehicle including the charged and discharged power of the auxiliary battery 42.

When the charged power Wadd is not set and the processing proceeds from the processing in step S109 to the processing in step S110, the controller 50 specifies the command power Pe to the engine 34 on the basis of the charged and discharged power set in the processing in step S103. Consequently, before the allowable input power Win decreases to be equal to or lower than the predetermined power Win_th and the charged power Wadd is set, the target SOC of the auxiliary battery 42 can be reduced to be lower than the reference value.

When the processing proceeds from the processing in step S108 to the processing in step S110, the controller 50 specifies the command power Pe to the engine 34 on the basis of the charged power Wadd set in the processing in step S108.

When the charged power Wadd of the auxiliary battery 42 is set according to the processing in step S108, electric power can be supplied from the MG1 to the auxiliary battery 42 by the charged power Wadd. Therefore, it is possible to increase the command power Pe to the engine 34 by the set charged power Wadd. It is possible to increase the command power Pe to be larger than the threshold Pth. In the processing in step S108, the charged power Wadd of the auxiliary battery 42 may be set such that the command power Pe does not decreases to be smaller than the threshold Pth.

According to the processing shown in FIG. 4, the charged power Wadd is sometimes continuously set until the measured time t increases to be longer than the predetermined time t_th. In other words, the setting of the charged power Wadd by the processing in step S108 is performed during the predetermined time t_th. Therefore, during the predetermined time t_th, the command power Pe to the engine 34 can be continued to be maintained in a state in which the command power Pe is larger than the threshold Pth. Consequently, it is possible to prevent the operation of the engine 34 from being frequently switched between the load operation and the self-supported operation. It is possible to prevent the user to feel discomfort.

Note that, when the shift position is switched from the P range to another range, according to the processing shown in FIG. 4, the setting of the charged power Wadd is released. In this case, the output required in the entire vehicle tends to increase. The command power Pe to the engine 34 tends to be larger than the threshold Pth. When the allowable input power Win increases to be higher than the predetermined power Win_th, according to the processing shown in FIG. 4, the setting of the charged power Wadd is released. In this case, electric power can be supplied from the MG1 to the main battery 10. The command power Pe to the engine 34 tends to be larger than the threshold Pth. Consequently, the operation of the engine 34 is not frequently switched between the load operation and the self-supported operation. It is possible to prevent the user to feel discomfort.

Figure 6:
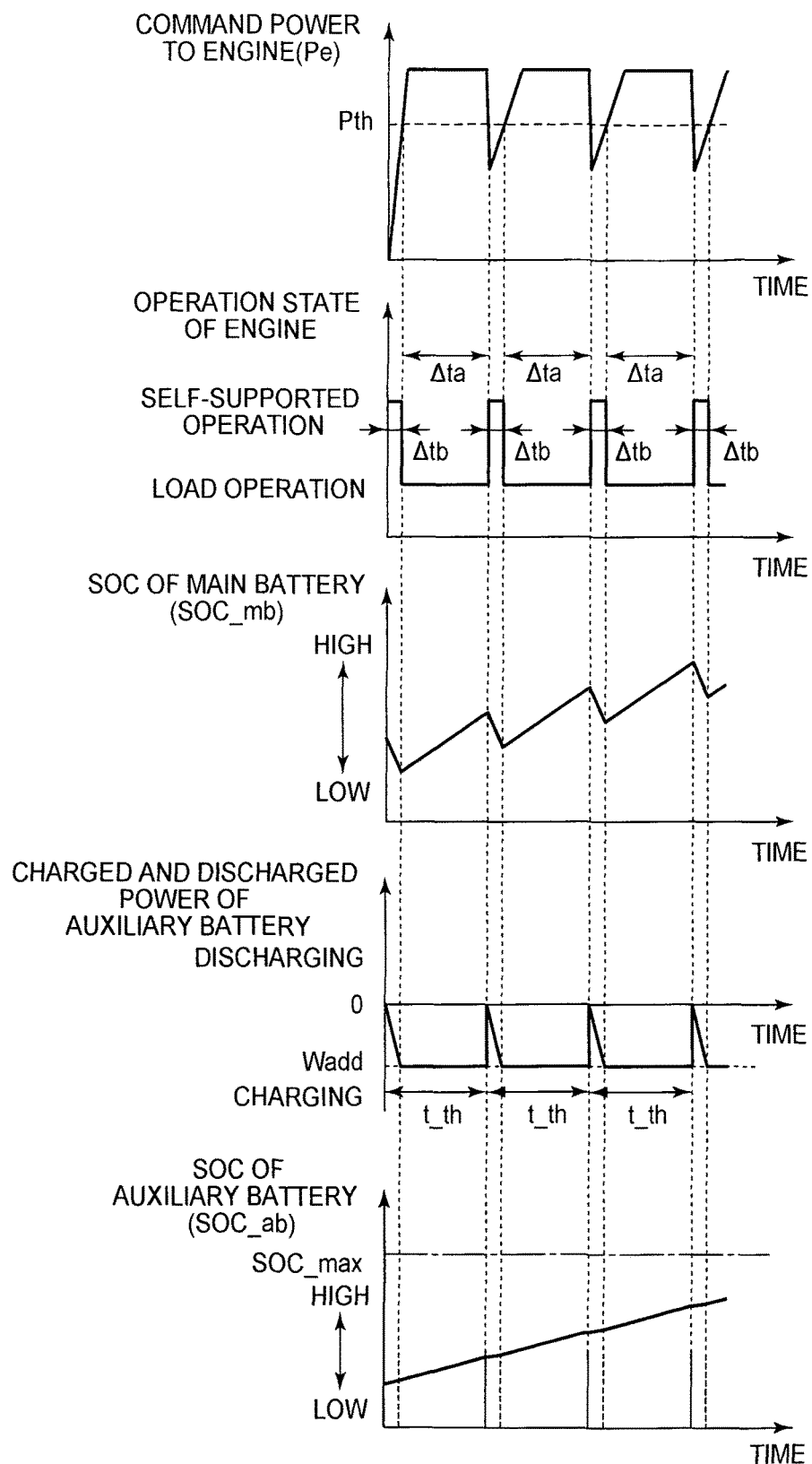
FIG. 6 is a diagram showing command power and an operation state of an engine, the SOC of the main battery, the charged and discharged power of the auxiliary battery, and an SOC of the auxiliary battery.

FIG. 6 shows a behavior of the command power Pe to the engine 34, a change in the operation state of the engine 34, a behavior of the SOC (SOC_mb) of the main battery 10, a behavior of the charged power Wadd of the auxiliary battery 42, and a behavior of the SOC (SOC_ab) of the auxiliary battery 42 at the time when the processing shown in FIG. 4 is performed. FIG. 6 shows a state after the processing in step S108 shown in FIG. 4 is performed. The SOC of the auxiliary battery 42 reaches the target SOC (the reduced target SOC) set in the processing in step S103 shown in FIG. 4.

As shown in FIG. 6, the auxiliary battery 42 is charged by the charged power Wadd set in the processing in step S108 shown in FIG. 4. The SOC of the auxiliary battery 42 increases. According to the increase in the SOC of the auxiliary battery 42, the command power Pe to the engine 34 increases to be larger than the threshold Pth. The operation of the engine 34 is switched from the self-supported operation to the load operation. The SOC of the main battery 10 increases according to the load operation of the engine 34.

When the predetermined time t_th elapses from the start of the setting of the charged power Wadd, the setting of the charged power Wadd is released according to the processing in step S109 shown in FIG. 4. According to the release of the setting of the charged power Wadd, as shown in FIG. 6, the charged power of the auxiliary battery 42 decreases. According to the release of the setting of the charged power Wadd, the command power Pe to the engine 34 sometimes decreases to be smaller than the threshold Pth. Consequently, the operation of the engine 34 is switched from the load operation to the self-supported operation.

In an example shown in FIG. 6, after the setting of the charged power Wadd is released, the charged power Wadd is set again. Consequently, the command power Pe to the engine 34 increases to be larger than the threshold Pth. The operation of the engine 34 is switched from the self-supported operation to the load operation.

In this embodiment, the predetermined time t_th is set. However, the predetermined time t_th does not have to be set. Specifically, the processing in step S107 shown in FIG. 4 may be omitted. After the setting of the charged power Wadd is started, the charged power Wadd may be continued to be set irrespective of the time t. Even in this case, it is possible to maintain the command power Pe to the engine 34 in a state in which the command power Pe is larger than the threshold Pth.

However, time until the SOC (SOC_ab) of the auxiliary battery 42 reaches the upper limit value SOC_max (referred to as reaching time) is different when the predetermined time t_th is not set and the setting of the charged power Wadd is continued and when the setting of the charged power Wadd is temporality released every time the predetermined time t_th elapses. That is, the reaching time is longer when the setting of the charged power Wadd is released than when the setting of the charged power Wadd is continued.

When the SOC_ab increases to be higher than the upper limit value SOC_max, the charged power Wadd cannot be set according to the processing shown in FIG. 4. In this case, the command power Pe to the engine 34 decreases to be smaller than the threshold Pth. The operation of the engine 34 tends to be frequently switched between the load operation and the self-supported operation. If the setting of the charged power Wadd is released every time the predetermined time t_th elapses as in this embodiment, it is possible to delay the increase in the SOC_ab and extend the time until the SOC_ab reaches the upper limit value SOC_max as explained above. Consequently, it is easy to secure time until the operation of the engine 34 is frequently switched.

On the other hand, when the setting of the charged power Wadd is released every time the predetermined time t_th elapsed, as shown in FIG. 6, the command power Pe of the engine 34 changes between a value larger than the threshold Pth and a value smaller than the threshold Pth. According to the setting of the predetermined time t_th, time Δta in which the load operation is performed can be set longer than time Δtb in which the self-supported operation is performed. Consequently, it is possible to prevent the operation of the engine 34 from being frequently switched between the load operation and the self-supported operation. It is possible to prevent the user to feel discomfort caused by fluctuations in the speed of the engine 34.

The predetermined time t_th explained in this embodiment is equivalent to the predetermined time in the invention. When the predetermined time t_th is not set as explained above, time from the start of the setting of the charged power Wadd until SOC_ab increases to be higher than the upper limit value SOC_max is equivalent to the predetermined time in the invention.

In the processing shown in FIG. 4, when the shift position is switched from the P range to another range, the setting of the charged power Wadd is released. In this case, time from the start of the setting of the charged power Wadd until the shift position is switched from the P range to another range is equivalent to the predetermined time in the invention. In the processing shown in FIG. 4, when the allowable input power Win increases to be higher than the predetermined power Win_th, the setting of the charged power Wadd is released. In this case, time from the start of the setting of the charged power Wadd until the allowable input power Win increases to be higher than the predetermined power Win_th is equivalent to the predetermined time in the invention.

On the other hand, when the self-supported operation of the engine 34 is performed, in order to secure power consumption of the auxiliary machine, the main battery 10 is sometimes discharged. When the operation of the engine 34 is frequently switched between the load operation and the self-supported operation, if discharged power of the main battery 10 during the self-supported operation is higher than the charged power of the main battery 10 during the load operation, the SOC of the main battery 10 sometimes continues to decrease.

In this embodiment, as shown in FIG. 6, the time Δta in which the load operation is performed can be set longer than the time Δtb in which the self-supported operation is performed. Consequently, even if the SOC of the main battery 10 decreases because of the self-supported operation, the SOC of the main battery 10 is easily increased by performing the load operation in time longer than the time of the self-supported operation. That is, according to the charging of the main battery 10 involved in the load operation, it is easy to restore the SOC of the main battery 10 to a state before the decrease. As the time Δta in which the load operation is performed, it is sufficient if time for restoring the SOC of the main battery 10 can be secured. The predetermined time t_th can be set taking into account this point as well.

In this embodiment, in the processing in steps S105 and S106 shown in FIG. 4, a state in which the operation of the engine 34 is frequently switched between the load operation and the self-supported operation is specified by checking the shift position and the allowable input power Win. However, the invention is not limited to this. That is, the state in which the operation of the engine 34 is frequently switched only has to be specified.

For example, when the shift position is the N range, when the load operation and the self-supported operation are performed, in the processing in step S105, the controller 50 may determine whether the shift position is the N range. In the N range, the command power Pe to the engine 34 tends to decrease. Therefore, the N range can be considered to be equivalent to the P range.

If the command power Pe to the engine 34 can be specified, instead of the processing in steps S105 and S106, the controller 50 can determine, on the basis of the specified command power Pe, whether the operation of the engine 34 is frequently switched between the load operation and the self-supported operation. Specifically, when the specified command power Pe is smaller than the threshold Pth, the controller 50 can determine that the operation of the engine 34 is frequently switched. In this case, the charging power Wadd can be set.

In this embodiment, before the allowable input power Win decreases to be equal to or lower than the predetermined power Win_th, the target SOC of the auxiliary battery 42 is reduced according to the processing in step S103 shown in FIG. 4. However, the invention is not limited to this. Specifically, even after the allowable input power Win decreases to be equal to or lower than the predetermined power Win_th, it is possible to reduce the target SOC of the auxiliary battery 42. If the electric power of the auxiliary battery 42 can be supplied to the MG2, even after the allowable input power Win decreases to be equal to or lower than the predetermined power Win_th, it is easy to reduce the target SOC of the auxiliary battery 42.

Note that, in this embodiment, the bidirectional DC-DC converter 41 is used. However, the invention is not limited to this. In order to prevent the operation of the engine 34 from being frequently switched between the load operation and the self-supported operation, it is sufficient if the electric power generated by the MG1 in the load operation can be supplied to the auxiliary battery 42. Therefore, a DC-DC converter can be used that steps down an output voltage of the MG1 (the inverter 31) and outputs electric power after the step-down to the auxiliary battery 42. The DC-DC converter does not include a function of stepping up an output voltage of the auxiliary battery 42.

What is claimed is:

1. A vehicle comprising:
   a generator;
   an auxiliary battery that supplies electric power to a load and is charged by the generator;
   an engine;
   a controller that controls charging and discharging of the auxiliary battery and specifies command power to the engine based on an output required in an entirety of the vehicle;
   a main battery that outputs energy used for traveling of the vehicle and is charged by the generator; and
   a DC-DC converter that steps down an output voltage of the generator to the auxiliary battery,
   wherein the engine: operates based on the command power, performs a load operation in which the engine operates while driving the generator when the command power is equal to or larger than a threshold, and performs a self-supported operation in which the engine operates without driving the generator when the command power is smaller than the threshold, and
   when an upper limit of an allowable charging power of the main battery decreases and the command power is in a state in which the load operation and the self-supported operation are alternately switched, the controller operates a continuous charging to charge the auxiliary battery continuously for a predetermined time with a charging power which increases the command power to be equal to or larger than the threshold.

2. The vehicle according to claim 1, wherein when the controller operates the continuous charging, the controller stops the charging of the auxiliary battery every time the predetermined time elapses.

3. The vehicle according to claim 1, wherein
   the upper limit changes according to a parameter indicating a state of the main battery, and
   the controller monitors the parameter and discharges the auxiliary battery before the upper limit decreases.

4. The vehicle according to claim 3, further comprising:
   a motor that converts input electric power into kinetic energy used for traveling of the vehicle,
   wherein when the auxiliary battery is discharged, the DC-DC converter steps up an output voltage of the auxiliary battery and outputs electric power with a step-up voltage to the motor.

5. The vehicle according to claim 1, wherein the controller sets the charging power according to a difference between the command power before operating the continuous charging and the threshold.

6. The vehicle according to claim 1, further comprising:
   a sensor that outputs information concerning detection of a shift position to the controller,
   wherein the controller operates the continuous charging when the upper limit is equal to or smaller than predetermined power and the shift position is one of a parking range and a neutral range.

7. A control method for a vehicle, the vehicle including a generator, an auxiliary battery that supplies electric power to a load and is charged by the generator, an engine, a controller that controls charging and discharging of the auxiliary battery and specifies command power to the engine based on an output required in an entirety of the vehicle, a main battery that outputs energy used for traveling of the vehicle and is charged by the generator, and a DC-DC converter that steps down an output voltage of the generator to the auxiliary battery, the engine: operating based on the command power, performing a load operation in which the engine operates while driving the generator when the command power is equal to or larger than a threshold, and performing a self-supported operation in which the engine operates without driving the generator when the command power is smaller than the threshold, the control method comprising:
   operating a continuous charging by the controller when an upper limit of an allowable charging power of the main battery decreases and the command power is in a state in which the load operation and the self-supported operation are alternately switched, the continuous charging being to charge the auxiliary battery continuously for a predetermined time with a charging power which increases the command power to be equal to or larger than the threshold.

* * * * *